(12) United States Patent
Glimpel et al.

(10) Patent No.: US 8,858,134 B2
(45) Date of Patent: Oct. 14, 2014

(54) DRILLING TOOL HAVING POINT THINNING

(75) Inventors: Helmut Glimpel, Lauf a.d. Pegnitz (DE); Bernhard Borschert, Bamberg (DE)

(73) Assignee: EMUGE-Werk Richard Gimpel GmbH & Co. KG Fabrik für Präzisionswerkzeuge, Lauf a.d. Pegnitz (DE)

(*) Notice: Subject to any disclaimer, the term of this patent is extended or adjusted under 35 U.S.C. 154(b) by 1035 days.

(21) Appl. No.: 12/812,864

(22) PCT Filed: Jan. 14, 2009

(86) PCT No.: PCT/EP2009/000170
§ 371 (c)(1),
(2), (4) Date: Sep. 2, 2010

(87) PCT Pub. No.: WO2009/090042
PCT Pub. Date: Jul. 23, 2009

(65) Prior Publication Data
US 2010/0322726 A1     Dec. 23, 2010

(30) Foreign Application Priority Data
Jan. 15, 2008   (DE) .......................... 10 2008 004 564

(51) Int. Cl.
*B23B 51/02*   (2006.01)

(52) U.S. Cl.
CPC .................................... *B23B 51/02* (2013.01)
USPC ........................................................ 408/230

(58) Field of Classification Search
USPC ......................................... 408/227, 229, 230
IPC .............................................. B23B 51/00, 51/02
See application file for complete search history.

(56) References Cited

U.S. PATENT DOCUMENTS

| 2,778,252 A * | 1/1957 | Oxford, Jr. ..................... 408/230 |
| 4,688,972 A * | 8/1987 | Kubota .......................... 408/230 |
| 5,230,593 A * | 7/1993 | Imanaga et al. ................ 408/230 |
| 5,716,172 A * | 2/1998 | Nakamura et al. ............. 408/230 |
| 2003/0215297 A1* | 11/2003 | Frisendahl ..................... 408/230 |
| 2008/0019787 A1* | 1/2008 | Sampath et al. ............... 408/230 |
| 2008/0089753 A1* | 4/2008 | Takikawa ....................... 408/230 |
| 2008/0199268 A1 | 8/2008 | Krenzer et al. |

FOREIGN PATENT DOCUMENTS

| DE | 102006018322 A1 | 10/2007 |
| EP | 320881 A2 | 6/1989 |

(Continued)

*Primary Examiner* — Daniel Howell
(74) *Attorney, Agent, or Firm* — Workman Nydegger (57) ABSTRACT

A rotatable drilling tool has cutting edges (on a face side) that merge inwardly into a chisel edge, with the chisel edge(s) running on the face side about a central region surrounding the tool axis, with the chisel edges forming, in the innermost region (or about a point thinning region), a residual chisel edge, with cutting edge corners being formed at the outer ends of the main cutting edges, with a straight connecting line that runs through two cutting edge corners of main cutting edges situated opposite one another in relation to the tool axis, or if an opposite main cutting edge is not present, through a cutting edge corner and the tool axis, with the chisel edge inner region running from the outer end of the residual chisel edge within a region with an angle of between $-15°$ and $+15°$ in relation to a parallel to the connecting line.

22 Claims, 5 Drawing Sheets

(56) References Cited

FOREIGN PATENT DOCUMENTS

| | | | | |
|---|---|---|---|---|
| EP | 2007539 | A1 | | 12/2008 |
| JP | 06320316 | A | * | 11/1994 |
| JP | 2002126825 | A | * | 5/2002 |
| SU | 1502228 | A | * | 8/1989 |
| WO | 9950014 | A1 | | 10/1999 |

* cited by examiner

DRILLING TOOL HAVING POINT THINNING

BACKGROUND OF THE INVENTION

1. Field of the Invention

The invention relates to a drilling tool.

2. Background and Relevant Art

Drilling tools are known which are rotatable about a tool axis and which, on their face side, have two or three main cutting edges which merge in the inward direction into a chisel edge. The chisel edge runs in a central region or core region of the drilling tool on the face side thereof. Contrary to its name, the chisel edge of a drilling tool usually primarily has not a cutting but rather a scraping action. It is usually perpendicular to the drilling or feed direction, and increases the required working pressure. The feed force for the chisel edge may amount to approximately ⅓ of the entire feed force for the drilling tool. Furthermore, there is the risk of a so-called "runaway", that is to say a lateral positional displacement upon the start of drilling. The self-centering capability of such drilling tools is therefore not particularly good.

To reduce said disadvantages, drilling tools, in particular drilling tools with straight main cutting edges, are often provided with a so-called point thinning, in particular with a crossed point thinning or a so-called S-shaped point thinning, in order to shorten the chisel edge. A disadvantage of said point thinning shapes is however that the self-centering capability of such drilling tools is not good. The reason for this is that the angle between the point-thinned chisel edge, which is also referred to as the residual chisel edge, and the chisel edge part over the central region is highly obtuse. Said angle usually lies in a range from 130° to 160°.

It has therefore already been attempted to increase the residual chisel edge angle, that is to say the angle between the residual chisel edge and a straight connecting line of the outer ends of the main cutting edges, the so-called cutting edge corners, from the usual 55° to approximately 70°. This has the disadvantage, however, that the clearance angle between the drilling tool and machine surface becomes considerably smaller in the central region, and the drilling tool no longer moves freely in the central region.

Another possibility for improving the self-centering capability is to reduce the chisel edge angle, that is to say the angle between the non-point-thinned chisel edge and the connecting line of the cutting edge corners, to for example 10°. This is however only possible in drilling tools with a concavely curved main cutting edge. In drills with a straight or convexly curved main cutting edge, the reduction in said chisel edge angle would result in the point thinning being drawn into the region of the main cutting edge. This would have the disadvantage of the rake angle in said region becoming too small.

Patent document DE 83 531 and the additional patent 84 413 propose a cylindrical drill with a straight or helically coiled longitudinal groove which bears sharp-edged longitudinal ribs on the surfaces pointing towards the cutting edges.

DE 199 83 068 T1 relates to a drilling head with a concave chisel edge which merges with secondary cutting edges of the two bevels via the axially outermost extremities, which are spaced apart from the axis, of said secondary cutting edges.

BRIEF SUMMARY OF THE INVENTION

It is now an object of the invention to provide a drilling tool, in particular having a crossed point thinning or S-shaped point thinning, which has an improved self-centering behavior, and to thereby at least partially avoid the above-stated disadvantages.

Said object is achieved by means of a drilling tool according to claim 1 and further embodiments of the invention. Advantageous refinements emerge from the claims which are dependent in each case on claim 1 and on the further embodiments of the invention.

According to claim 1, the invention relates to a drilling tool which is rotatable about a central tool axis, which has at least two main cutting edges which are arranged on a face side and which merge in the inward direction toward the tool axis into at least one chisel edge, with the chisel edges running on the face side in or over a central region surrounding the tool axis, with the chisel edges forming, in the innermost region running through or in the region of the tool axis, and/or at the inside adjoining a point thinning region, a residual chisel edge, with cutting edge corners being formed at the outer ends of the main cutting edges, with a straight connecting line being defined which runs through two cutting edge corners of main cutting edges situated opposite one another in relation to the tool axis, or if an opposite main cutting edge is not present, through a cutting edge corner and the tool axis, with the chisel edge inner region running from the outer end of the residual chisel edge within a region with an angle of between −15° and +15° in relation to a parallel to the connecting line, and in particular having a length of 1/100 to 1/10 of the drill diameter, preferably as far as the base side of the region. An angle range of between −15° and +15° in relation to a parallel to the connecting line is on the one hand a good possibility for improving the self-centering capability, but on the other hand the drilling tool has adequately high stability in the region of the chisel edge. A length of 1/100 to 1/10 of the drill diameter generally likewise permits an improved self-centering capability, wherein at the same time the rolling radius of the chips formed during drilling is not too large.

According to a further embodiment of the invention, which is claimed both independently and also dependently, the invention relates to a drilling tool which is rotatable about a central tool axis, which has at least two main cutting edges which are arranged on a face side and which merge in the inward direction toward the tool axis into at least one chisel edge, with the chisel edge running on the face side in or over a central region surrounding the tool axis, with the chisel edges forming, in the innermost region running through or in the region of the tool axis, and/or at the inside adjoining a point thinning region, a residual chisel edge, with cutting edge corners being formed at the outer ends of the main cutting edges, with a straight connecting line being defined which runs through two cutting edge corners of main cutting edges situated opposite one another in relation to the tool axis, or if an opposite main cutting edge is not present, through a cutting edge corner and the tool axis, with the chisel edge, in particular the chisel edge inner region, running and/or extending within a region, a) with the region extending from a tip at the start of the chisel edge inner region at the outer end of the residual chisel edge, along a line of symmetry running parallel to the connecting line, preferably over a length of 1/100 to 1/10 of the drill diameter, in particular as far as transversely with respect to the end of the chisel edge inner region at the inner region of curvature and/or as far as a base side, c) with the region being symmetrical with respect to the line of symmetry and having a width b at the point l of $$b(l) = 2 \cdot l \cdot \tan 15°,$$

d) with the variable l denoting the spacing to the tip along the line of symmetry.

This embodiment and the following embodiment preferably also yield an angle range of between −15° and +15° in relation to a parallel to the connecting line, which firstly is a good possibility for improving the self-centering capability, wherein secondly the drilling tool has adequately high stability in the region of the chisel edge. A length of 1/100 to 1/10 of the drill diameter generally likewise permits an improved self-centering capability, wherein at the same time the rolling radius of the chips formed during drilling is not too large.

According to a further embodiment of the invention which is claimed both independently and also dependently, the invention relates to a drilling which is rotatable about a central tool axis, which has at least two main cutting edges which are arranged on a face side and which merge in the inward direction toward the tool axis into at least one chisel edge, with the chisel edges running on the face side in or over a central region surrounding the tool axis, with the chisel edges forming, in the innermost region running through or in the region of the tool axis, and/or at the inside adjoining a point thinning region, a residual chisel edge, with cutting edge corners being formed at the outer ends of the main cutting edges, with a straight connecting line being defined which runs through two cutting edge corners of main cutting edges situated opposite one another in relation to the tool axis, or if an opposite main cutting edge is not present, through a cutting edge corner and the tool axis, with the chisel edge, in particular the chisel edge inner region, running and/or extending within a region,
b) with the region having the shape of a triangle in cross section,
c) with the triangle extending in height from a tip at the start of the chisel edge inner region at the outer end of the residual chisel edge, along a line of symmetry running parallel to the connecting line, in particular as far as transversely with respect to the end of the chisel edge inner region at the inner region of curvature and/or as far as a base side,
d) with the height of the triangle preferably amounting to 1/100 to 1/10 of the drill diameter,
e) with the triangle being symmetrical with respect to the height h and/or being an equilateral triangle and/or running perpendicular to the tool axis,
f) with the triangle having a width b of $$b = 2 * h * \tan 15°.$$

In one advantageous embodiment, the region has a height parallel to the tool axis corresponding to half the height of the triangle, with preferably the start of the chisel edge inner region being arranged in the centre of the height of the region, with the region particularly preferably being in the form of a pyramid with the start of the chisel edge inner region as a tip. This likewise improves the self-centering capability, wherein at the same time the bore is of adequate quality, which means in particular that only at least comparatively small burrs can be generated at the edges of the bore.

The chisel edge preferably enters the region at its tip and departs from the region at its base side, with the base side running straight and/or at an angle of 90° to the connecting line.

In one advantageous embodiment, the chisel edge departs from the region at an angle of at least 25° with respect to the connecting line and/or at an angle of a maximum of 65° with respect to the base side. This enables a good cutting action of the main cutting edge, in particular because the chisel edge outer region is not excessively long.

The residual chisel edge preferably runs straight, and/or the chisel edge, preferably the residual chisel edge, forms a centering tip, and/or the residual chisel edge is the or a cutting tip, with the centering tip preferably running straight, with an angle, in particular a clearance angle, of 8° to 15°, preferably 10° to 12°, preferably being present between the centering tip of the drilling tool and an in particular planar surface to be machined. The centering behavior can be further improved in this way, with in particular a straight residual chisel edge simultaneously increasing its stability because the probability of a breakaway and/or break-off is reduced.

According to a further embodiment of the invention which is claimed both independently and also dependently, the drilling tool according to the invention is rotatable about a central tool axis and has a face side, that is to say a side at an end situated axially with respect to the tool axis. Arranged on said face side are at least two main cutting edges which merge in the inward direction toward the tool axis into in each case one chisel edge or into a common cutting edge. The chisel edge runs in or over a central region or core region of the drilling tool, which surrounds the tool axis or is arranged centrally around the tool axis, at the face side of said drilling tool. The chisel edge now has at least one region, in particular a point thinning region, in which the chisel edge has or forms an inner region of curvature and subsequently an outer region of curvature as viewed outward toward an adjoining main cutting edge from the inside or from the central axis, with the inner region of curvature being curved oppositely to the outer region of curvature.

Said special shape or point thinning of the chisel edge leads to an expediently shaped centering region or a centering tip on the chisel edge, and thereby enables improved self-centering of the drilling tool without a considerable impairment of the dimensions of the main cutting edges being necessary.

The outer region of curvature preferably has a left-hand curvature in the direction of the tool axis and the inner region of curvature preferably has a right-hand curvature in the direction of the tool axis. The outer region of curvature preferably forms a convex curvature and the inner region of curvature preferably forms a concave curvature. Here, a point of inflection is preferably formed between the outer region of curvature and the inner region of curvature, that is to say a point at which, in a geometrical sense, the curvature changes from a left-hand curvature to a right-hand curvature or vice versa or, from an analytical aspect, the second derivative changes its sign. Said stated embodiments enable particularly simple point thinning of the chisel edge or the formation of a centering tip on the chisel edge.

In one advantageous embodiment, the outer region of curvature of the chisel edge is situated in the transition region or directly adjacent to the main cutting edge. The transition of the chisel edge into the main cutting edge generally takes place at the outer edge of the central region.

One or both of the two regions of curvature which are curved oppositely to one another is/are preferably formed by a rounded portion of the chisel edge, in particular with smooth or continuously differentiable transitions. This enables a uniform transition from the main cutting edge to chisel edge and therefore uniform drilling behavior from the inside to the outside. The radius of curvature of the outer region of curvature may be constant or variable and is in particular selected from a range between 0.08 mm and 3 mm. The radius of curvature of the inner region of curvature may also be constant or variable and is in particular selected from a range between 0.1 mm and 1 mm. The region(s) of curvature may however also be of practically angular design or formed with an even smaller radius of curvature.

In one advantageous embodiment, the chisel edge forms, in particular in its at least one point thinning region, a preferably at least partially at least approximately straight chisel edge outer region, and adjoining the latter at the inside a preferably at least approximately straight chisel edge inner region, with the inner region of curvature being arranged or situated between the chisel edge outer region and the chisel edge inner region. A particularly effective design of the centering region is possible in particular with an at least approximately straight design of the chisel edge inner region. The outer region of curvature of the chisel edge is then generally situated at the edge of the chisel edge outer region toward the main cutting edge.

A straight connecting line is now preferably defined which runs through two cutting edge corners situated at the outer ends of two main cutting edges situated opposite one another in relation to the tool axis, or if an opposite main cutting edge is not present, through the cutting edge corner of one main cutting edge and the tool axis.

The chisel edge inner region now runs preferably at an angle with respect to the connecting line, which angle is selected to be in a range from −20° to 30°, preferably from −15° to 15°, particularly preferably from 0° (that is to say in parallel) to 10°. It is particularly advantageous if the chisel edge inner region runs at least predominantly parallel to the connecting line. Said design makes it possible to form a centering tip which is particularly pronounced, or particularly expedient with regard to the self-centering of the drilling tool, on the chisel edge.

In one advantageous embodiment, the chisel edge has or forms a so-called residual chisel edge which is arranged in the innermost region running through or in the region of the tool axis and/or is arranged at the inside at the point thinning region of the chisel edge and/or is situated in a region of the chisel edge which divides end surfaces situated on the face side of the tool.

The following further angles are preferably selected with regard to the chisel edge:
  between the chisel edge inner region and chisel edge outer region, an obtuse angle which preferably lies in a range from 130° to 160°, in particular 145° to 150°;
  between the chisel edge outer region and connecting line, an acute angle which is selected in particular from a range from 20° to 50°, in particular from 30° to 35°;
  between the chisel edge inner region and residual chisel edge, an obtuse angle preferably in a range from 110° to 140° or particularly preferably in a range from 120° to 150°, in particular from 125° to 135°;
  between the residual chisel edge and connecting line, an acute angle, particularly preferably in a range from 40° to 60°, in particular approximately 55°,
  the sum of the angle between the chisel edge inner region and residual chisel edge on the one hand and the angle between the residual chisel edge and connecting line on the other hand, in a range from 170° to 190°, preferably a range from 180° to 190°.

Said forms and angles further improve the self-centering capability without adversely affecting the drilling behavior, since in this way a particularly pronounced point thinning in the region of the chisel edge is possible, which can firstly elevate the centering region to a more pronounced level, but which secondly does not adversely affect the main cutting edges.

The length of the chisel edge inner region preferably amounts to between $1/100$ and $1/10$ of the drill diameter.

In one advantageous embodiment, the centering region, in a section plane formed by the residual chisel edge, is delimited by the point thinning region and/or merges, in a section plane formed by the connecting line, into end surfaces. This makes it possible to form a centering region which has a different shape depending on which side it is viewed from, which further improves the behavior upon the start of drilling.

The end surfaces are preferably delimited by at least one end surface edge and/or a main cutting edge and are preferably provided with a conical point grinding or a surface grinding. Here, the end surfaces may either have in each case one or else a plurality of surfaces arranged at an angle to one another.

The chisel edges and/or the residual chisel edges and/or the point thinning region are/is preferably generated by a conical point grinding or a four-surface grinding process. This permits or facilitates at least relatively efficient and/or cheap production of the drilling tool.

At least one main cutting edge is preferably of straight design or designed to be curved along its profile in the same direction and/or of concave or convex design.

In one advantageous embodiment, the main cutting edges are arranged on load-bearing bodies or load-bearing regions which extend radially outward from the central region and run preferably helically in the axial direction, in particular between the chip grooves, and which on their side surfaces form the chip surfaces and on their outer surfaces form a land. This makes it possible for the chips to be transported away in an efficient manner.

It is preferable
  a) for the drilling tool to have bevels which determine the maximum diameter of the drilling tool,
  b) with the drilling tool having a relatively small diameter between the bevels, in particular in the region of the land.

This improves the guidance of the drilling tool in the drill hole.

In one advantageous embodiment, the tool has at least two chip grooves which open out on the face side, with the main cutting edges being arranged at a face-side end of the chip grooves, with coolant ducts preferably being arranged between the chip grooves. Coolant can be supplied via the coolant ducts during the drilling process, wherein said coolant can also be conducted via a side channel into the chip grooves.

The point thinning region preferably extends over the chip surface, preferably over the first and the second chip surface and/or over a depth of a maximum of 50% of the diameter of the drill. In this way, it is ensured that the drilling tool, in particular the chip grooves in the region facing away from the end faces, is adversely affected only to a small extent by the point thinning.

In one advantageous embodiment, the point thinning region is formed, in particular by means of an inwardly bevelled portion, such that the at least one chisel edge has the appearance of an S-shape as viewed from the face side (S-shaped point thinning).

The design of the drilling tool according to the invention can particularly advantageously be used in a drilling cool composed of hard metal, in particular solid carbide, though may likewise be used in drills composed of other materials such as working high-speed steels or super high-speed steels (HSS).

BRIEF DESCRIPTION OF THE DRAWINGS

The invention will be explained below on the basis of exemplary embodiments. Reference is made here to the drawings, in which, in each case schematically.

DETAILED DESCRIPTION OF THE PREFERRED EMBODIMENTS

Figure 1A:
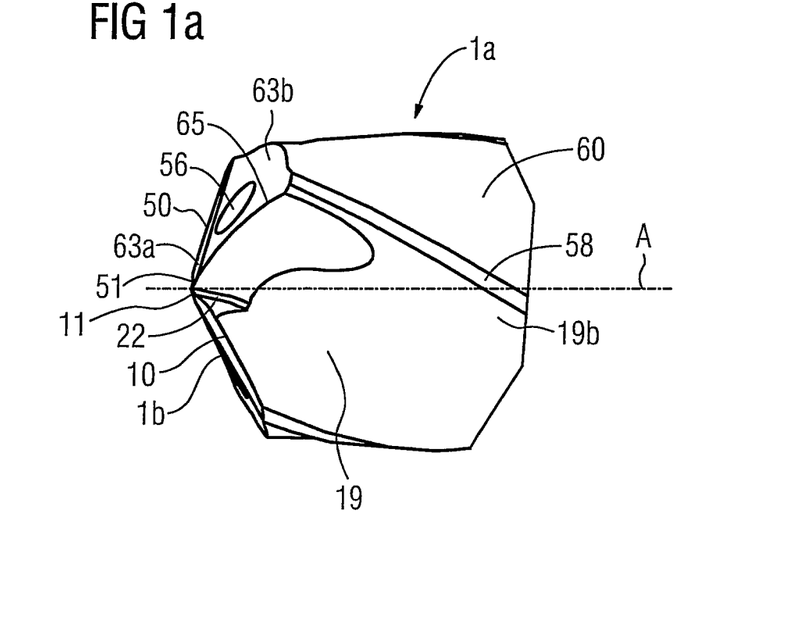
FIG. 1a shows the face region of a drilling tool according to the invention in a perspective illustration.
Figure 1B:
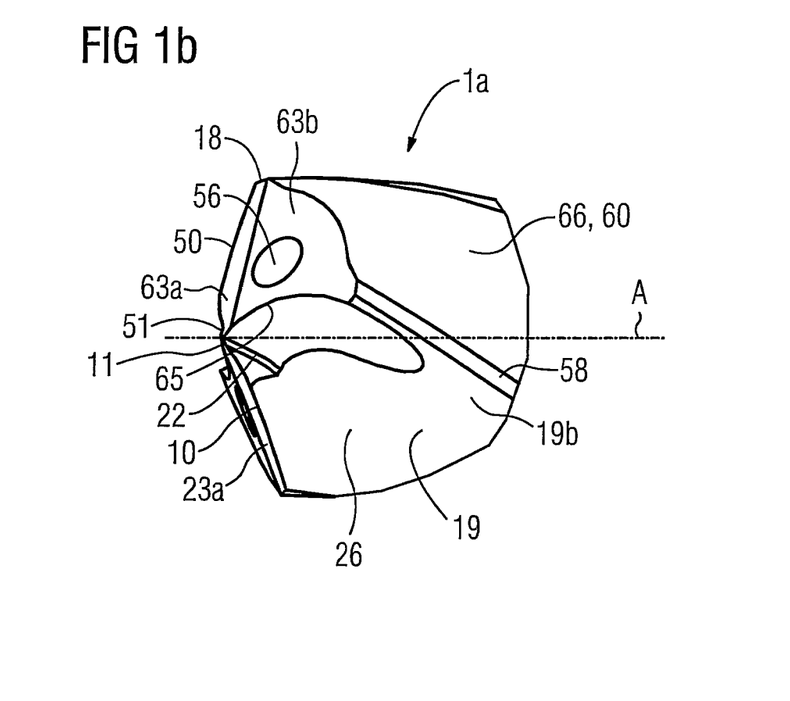
FIG. 1b shows the face region of the drilling tool according to FIG. 1a in a perspective illustration rotated slightly in relation to FIG. 1a, FIG. 2 shows a face-side view of the drilling tool according to the invention as per FIG. 1a, FIG. 3a shows a detail from a face-side view of the drill according to FIGS. 1a to 2, FIG. 3b likewise shows the detail according to FIG. 3a, FIG. 4 shows the silhouette of the drill up at 90° with respect to the residual chisel edge.
Figure 2:
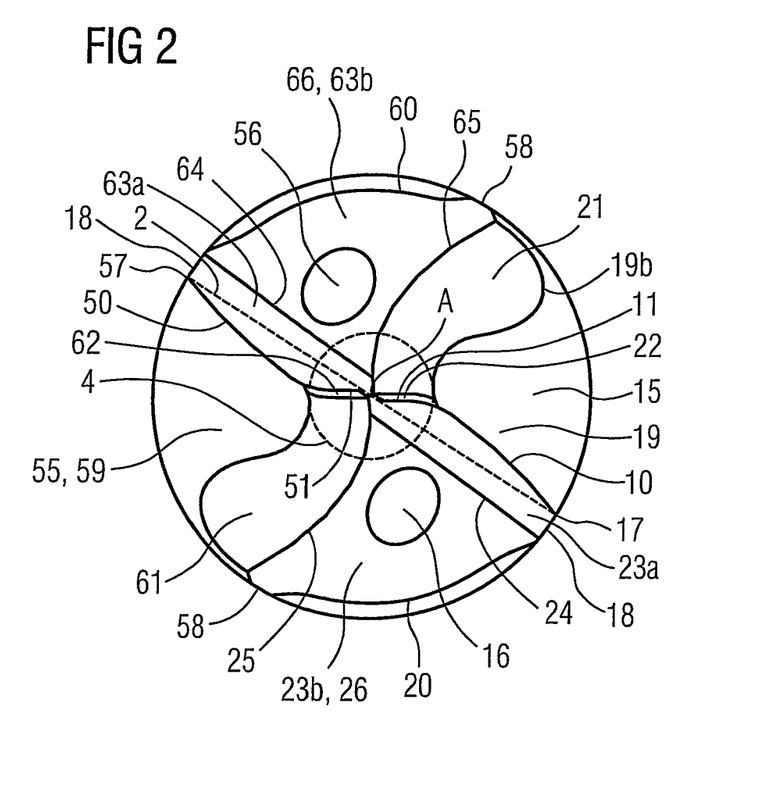
Figure 3A:
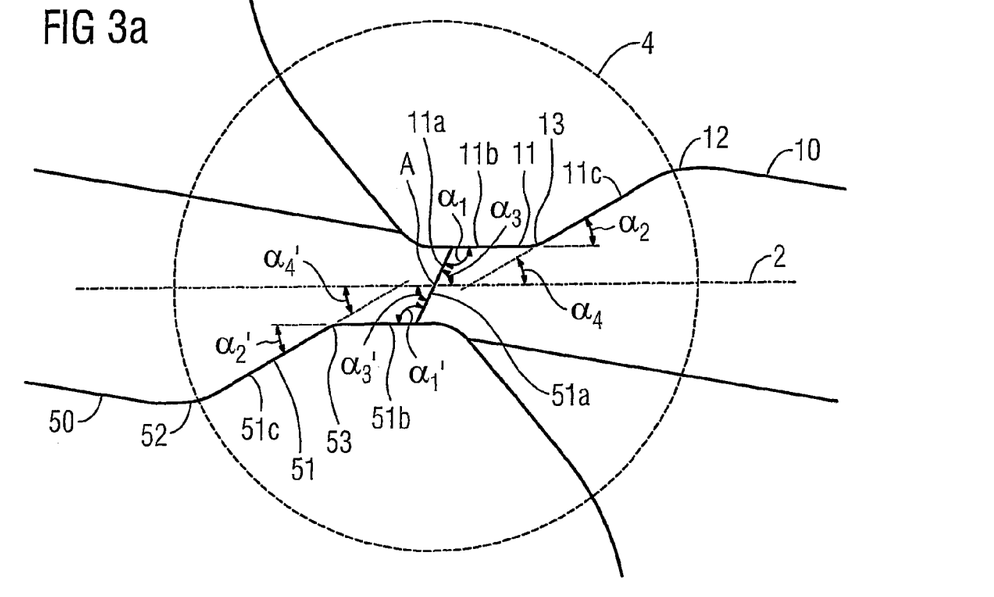
Figure 3B:
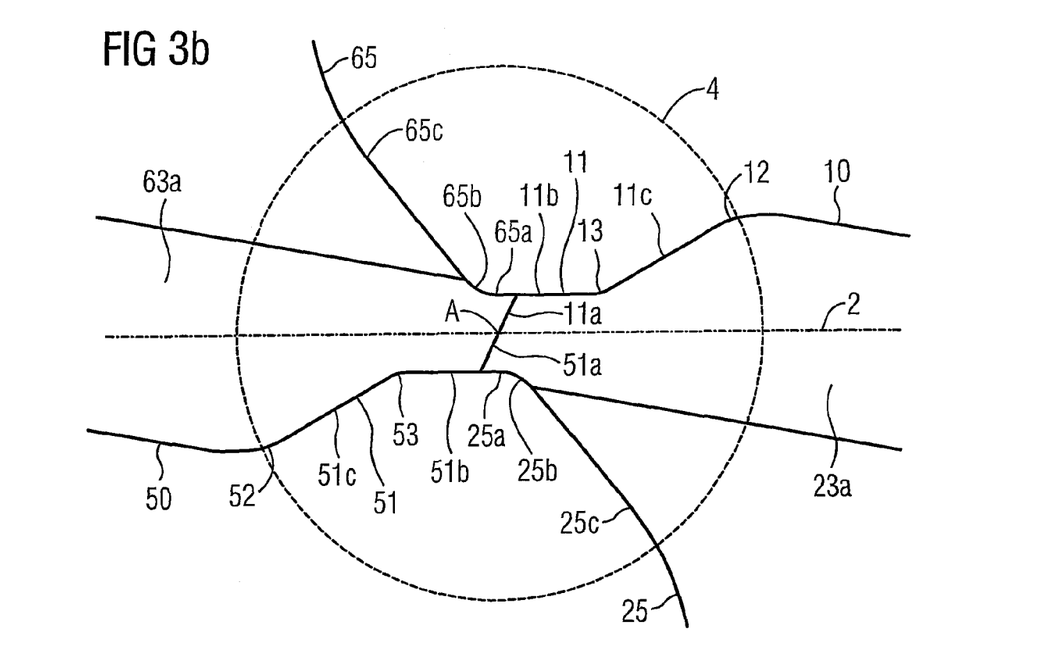

FIG. 1a shows the face side of a drill 1, viewed from the side, FIG. 1b shows the drill tip 1a according to FIG. 1a in a view rotated slightly in relation to FIG. 1a and likewise viewed from the side. FIG. 2 shows the drill 1 according to FIGS. 1a and 1b but in a view from the face side 1b. FIGS. 3a and 3b show a detail of a face-side view of the drill according to FIGS. 1a to 1b and FIG. 2.

In said drawings, FIG. 2 shows a drill 1 with two main cutting edges 10 and 50 extending in opposite directions.

The main cutting edge 10 is arranged on a load-bearing region 26 and the main cutting edge 50 is arranged on a load-bearing region 66, which load-bearing regions extend in each case from a central region 4.

At the outer end, the main cutting edge 10 forms a cutting edge corner 17 and the main cutting edge 50 forms a cutting edge corner 57. A connecting line 2 is depicted between the cutting edge corners 17 and 57.

The load-bearing region 26 is delimited at the face side by end surfaces 23a and 23b which are arranged adjacent to one another at an angle, and the load-bearing region 66 is delimited at the face side by two end surfaces 63a and 63b which are arranged adjacent to one another at an angle.

In the illustrated exemplary embodiment, the end surfaces 23a and 23b are also connected to one another by means of an end surface edge 24, and the end surfaces 63a and 63b are connected to one another by means of an end surface edge 64.

At its side situated opposite the end surface edge 24, the end surface 23a is delimited by the main cutting edge 10 and the chisel edge 11. At its side situated opposite the end surface edge 64, the end surface 63a is correspondingly delimited by the main cutting edge 50 and the chisel edge 51. The end surface 23a is delimited in the outward direction by the land 20, and the end surface 63a is delimited in the outward direction by the land 60.

On its side facing away from the main cutting edge 10, the end surface 23b has an end surface edge 25. Said end surface edge 25 delimits a point thinning region 21 which forms the face-side end of a chip groove 55. Correspondingly, on its side facing away from the main cutting edge 50, the end surface 63b has an end surface edge 65 which delimits a point thinning region 61 which forms the face-side end of a chip groove 25.

The end surface 23b has a coolant bore 16 in the region of the end surface edge 25. The end surface 63b likewise has a coolant bore 56 in the region of the end surface edge 65. The chip groove 15 is delimited by a chip surface 19 and a groove land surface 19b, which are in particular at an angle to one another.

The chip groove 55 is also delimited by a chip surface 59 and a groove land surface 59b.

The point thinning region 21 at the face-side end of the chip groove 15 extends from the chip surface 19 to the groove land surface 19b away from the face side and ends in an arc or in approximately a U-shape, with said point thinning region having a depth of approximately 30% of the drill diameter B.

The point thinning region 51 at the face-side end of the chip groove correspondingly extends from the chip surface 59a to the groove land surface 59b away from the face side and likewise ends in an arc or in approximately a U-shape, with said point thinning region having a depth of approximately 30% of the drill diameter B.

The main cutting edge 10, as can be seen from FIG. 3b, merges in the inward direction toward the central region 4 into a chisel edge 11 via an outer region of curvature 12 with a left-hand curvature. The main cutting edge 50 merges in the inward direction toward the central region 4 into the chisel edge 51 via an outer region of curvature 52 with a left-hand curvature.

The (combined) chisel edge 11, 51 therefore connects the main cutting edges 10 and 50.

The residual chisel edge 11a of the chisel edge 11 encompasses a part connecting end surfaces 23a and 63a and is also delimited in length by the point thinning regions 21 and 61.

The point-thinned region of the chisel edge 11 in turn has, at the inside in the direction of the central region 4 and adjoining the outer region of curvature 12, a chisel edge outer region 11c which merges via an inner, leftward-curved region of curvature 13 into the chisel edge inner region 11b, which in turn adjoins the residual chisel edge 11a.

The point-thinned region of the chisel edge 51 in turn has, at the inside in the direction of the central region 4 and adjoining the outer region of curvature 52, a chisel edge outer region 51c which merges via an inner, leftward-curved region of curvature 53 into the chisel edge inner region 51b, which in turn adjoins the residual chisel edge 51a.

The chisel edge inner region 11b and the chisel edge inner region 51b are in each case of at least predominantly rectilinear design, and here run parallel to the connecting line 2 between the cutting edge corners 17 and 57.

The chisel edge inner region 11b is adjoined, after the branch of the residual chisel edge 11a, rectilinearly by an end surface edge inner region 65a which, in this respect, is likewise parallel to the connecting line 2. The chisel edge inner region 51b is in the same way adjoined, after the branch of the residual chisel edge 51a, rectilinearly by an end surface edge inner region 25a which, in this respect, is likewise parallel to the connecting line 2.

The end surface edge inner region 25a is delimited at the other end by a region of curvature 25b in which said end surface edge inner region 25a merges into the end surface edge outer region 25c. The end surface edge inner region 65a is delimited at the other end by a region of curvature 65b in which said end surface edge inner region 65a merges into the end surface edge outer region 65c.

According to FIG. 2, the point thinning region 21 forms an inwardly bevelled portion 22. The inwardly bevelled portion 22 and the point thinning region 21 give the chisel edge 11 the appearance of an S shape as viewed from the face side 1b. The point thinning region 61 correspondingly forms a further inwardly bevelled portion 62 which, together with the rest of the point thinning region 61, gives the chisel edge 51 the appearance of an S shape as viewed from the face side 1b.

The chisel edge inner region 11b and the residual chisel edge 11a enclose with one another or form an obtuse angle $\alpha 1$ which lies in particular between 120° and 140°, and which is preferably approximately 125°. The chisel edge inner region 51b and the residual chisel edge 51a likewise enclose with one another an obtuse angle α1' which is selected in particular to be between 120° and 140°, and preferably approximately 125°.

Between the chisel edge inner region 11b and chisel edge outer region 11c, the inner region of curvature 13 is formed at an acute angle of curvature α2 of approximately 20° to 50°, in particular approximately 30° to 35°. Correspondingly, between the chisel edge inner region 51b and chisel edge outer region 51c, the inner region of curvature 53 is arranged at an acute angle of curvature α2' of approximately 20° to 50°, in particular approximately 30° to 35°. There is therefore an obtuse angle (not shown) of 180°−α2 and 180°−α2' respectively between the chisel edge inner region 11b and 51c and associated chisel edge outer region 11c and 51c.

In FIG. 3a, the angle α3 between the residual chisel edge 11a and the connecting line 2 is 180°−α1, and therefore lies in particular between 40° and 60°, and is in particular 55°. Correspondingly, in FIG. 3a, the angle α3' between the residual chisel edge 51a and the connecting line 2 is 180°−α1' and therefore likewise lies in particular between 40° and 60°, and is in particular 55°.

The angle α4 between the chisel edge outer region 11c and connecting line 2 corresponds, in the illustrated exemplary embodiment, to the angle α2 between the chisel edge inner region 11b and chisel edge outer region 11c. Correspondingly, for the angle α4' between the chisel edge outer region 51c and connecting line 2, it is true that said angle is equal to the angle α2' between the chisel edge inner region 51b and chisel edge outer region 51c. The connecting line 2 and the two chisel edge inner regions 11c and 51c are therefore in each case aligned parallel to one another in FIG. 3a.

Aside from the illustrated embodiment with chisel edge inner regions 11b and 51b parallel to the connecting line 2, it is also possible for each chisel edge inner region 11b and 51b to be inclined with respect to the connecting line 2 at an angle of up to 10°, preferably in the outward direction.

The length of the chisel edge inner region 11b amounts to between 1/100 and 1/10 of the drill diameter, as does the length of the chisel edge inner region 51b.

Figure 4:
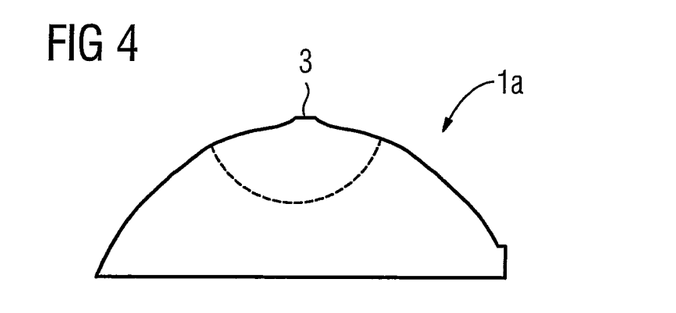

FIG. 4 shows a silhouette or a light projection as viewed in a microscope of the drill tip 1a at an angle of 90° to the residual chisel edge angle. It is possible to clearly see a straight centering tip 3 which is formed on or by the (point-thinned) chisel edge and which enables simpler centering of the drilling tool 1, with the probability of a breakaway of the centering tip at the same time being at least relatively low.

FIGS. 5a and 5b and 6a and 6b show, in each case schematically, two further embodiments of the chisel edges according to the invention.

Figure 5A:
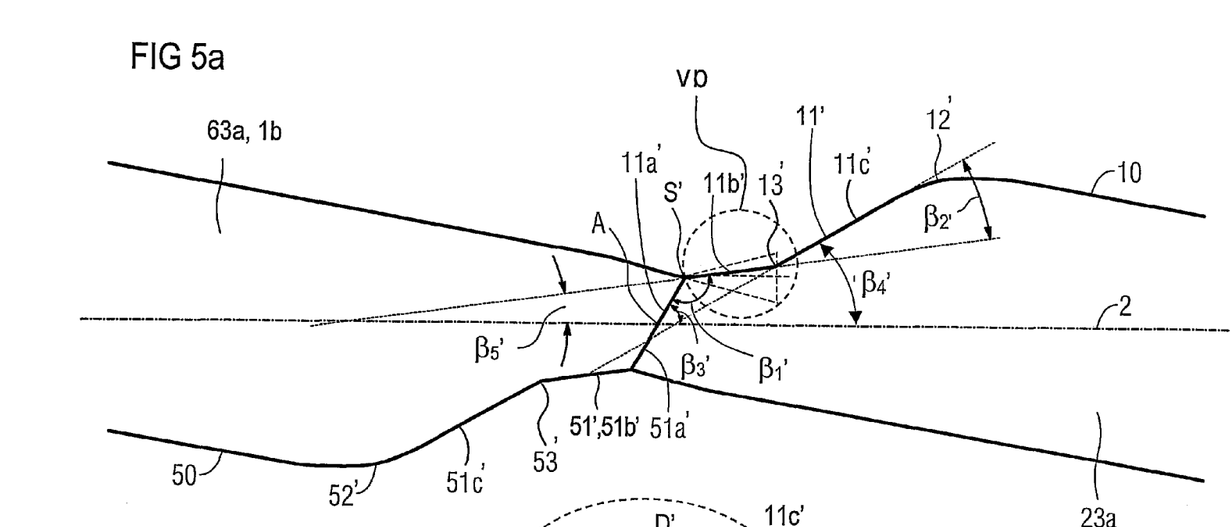
FIGS. 5a, 5b show a detail of a further embodiment of the drilling tool according to the invention.
Figure 5B:
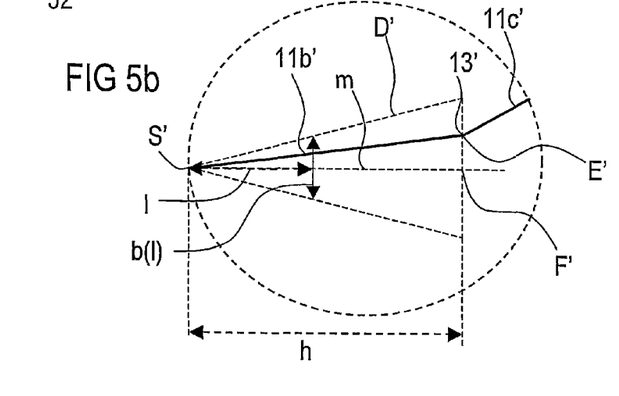

In contrast to the embodiment according to FIGS. 3a and 3b, in the embodiment according to FIGS. 5a and 5b, the chisel edge inner region 11b' is formed not parallel to the connecting line 2 but rather at an angle of approximately 8° thereto. This is shown as angle β5' in FIG. 5a. This results in an angle β2' between the chisel edge outer region 11c' and the chisel edge inner region 11b', which angle β2' lies in the region of approximately 25° and is preferably greater. Furthermore, the angle β1' between the residual chisel edge 11a' and the chisel edge inner region 11b' is increased to a value of approximately 130°. The angle β4' of the chisel edge outer region 11c' to the connecting line 2 is approximately 30°. Here, the length of the chisel edge inner region 11b' is approximately 1/50 of the drill diameter B. The chisel edge inner region 11b' runs at least substantially linearly.

The chisel edge inner region 11b' runs within a region D' which extends from its start S' at the outer end of the residual chisel edge 11a', parallel to the connecting line 2 over a length h of approximately 1/50 of the drill diameter B, as far as transversely with respect to the end E' of the inner region of curvature 13', with the width b of the region transversely with respect to the connecting line 2 at the point l being $$b(l)=2*l*\tan 15°.$$

The variable l denotes the spacing to the closest point on the connecting line 2.

The region D' is therefore in this case an equilateral triangle whose height amounts to approximately 1/50 of the drilling tool diameter B and whose equal angles amount to in each case 75°. Within said region D', at each point, the angle of an imaginary straight line through said point and the end of the residual chisel edge S' with respect to the connecting line 2 lies between +15° and −15°.

A corresponding description applies in each case to the chisel edge 51' with its chisel edge inner region 51b' and its chisel edge outer region 51c'.

Figure 6A:
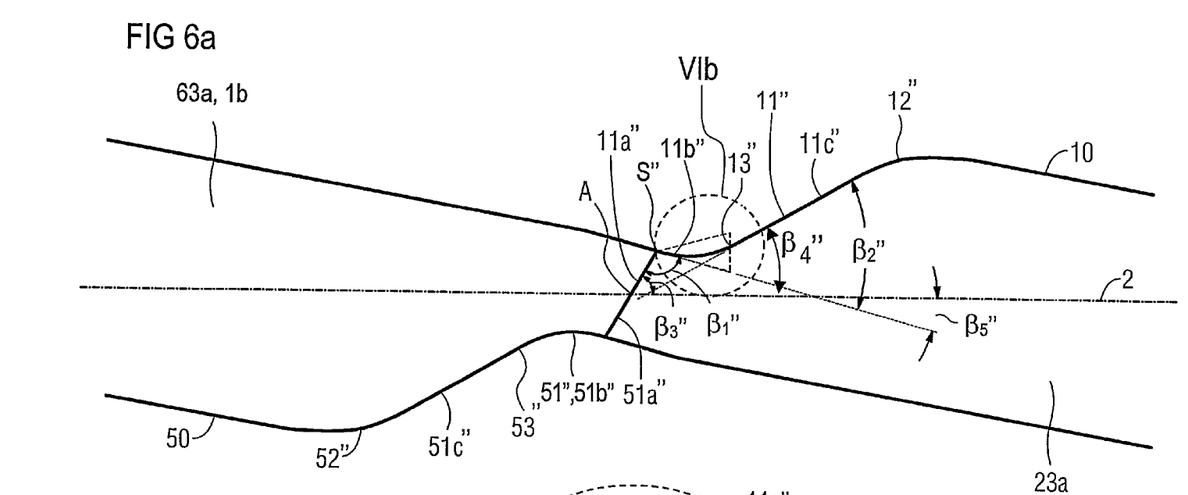
FIGS. 6a, 6b show a detail of a further embodiment of the drilling tool according to the invention.
Figure 6B:
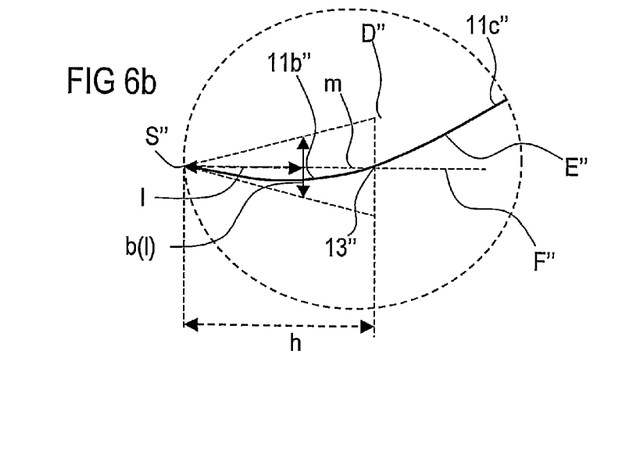

A further embodiment according to the invention is shown in FIGS. 6a and 6b, in which the inner region of curvature 13" between the chisel edge inner region 11b" and the chisel edge outer region 11c" is arranged closer to the end of the residual chisel edge S" than in FIGS. 5a and 5b. In this case, the angle β5" between the chisel edge inner region 11b" and the connecting line 2 is approximately −15°. Furthermore, the angle between the chisel edge inner region 11b" and the chisel edge outer region 11c" is approximately 45°. The angle β1" between the chisel edge inner region 11b" and the residual chisel edge 11a" is in this case approximately 95°.

The chisel edge inner region 11b" runs within a region D" which extends from its start S" at the outer end of the residual chisel edge 11a", parallel to the connecting line 2 over a length l of approximately 1/60 of the drill diameter B, as far as transversely with respect to the end E" in the inner region of curvature 13", with the width b of the region transversely with respect to the connecting line 2 at the point l being $$b(l)=2*l*\tan 15°.$$

The variable l denotes the spacing to the point S' along the connecting line 2.

The region D" is therefore likewise an equilateral triangle whose height amounts to approximately 1/60 of the drilling tool diameter B and whose equal angles amount to in each case 75°. Within the region D", at each point, the angle of an imaginary straight line through said point and the end of the residual chisel edge S" with respect to the connecting line 2 lies between +15° and −15°.

A corresponding description again applies in each case to the chisel edge 51" with its regions of curvature 52" and 53".

In this respect, the chisel edge inner region generally varies, in a region of the length from 0.01 to 0.1 of the drill diameter B, within an angle range of α5 from −15° to +15° with respect to the connecting line 2.

The angle α1 between the residual chisel edge and the chisel edge inner region lies in a range from approximately 120° to 150° or from 110° to 140°.

The residual chisel edge is of straight design and has been produced using a conventional conical point grinding and/or four-surface grinding process.

LIST OF REFERENCE SYMBOLS

1 Drilling tool
1a Drill tip

1b Face side
2 Connecting line
3 Centering tip
4 Central region
10, 50 Main cutting edge
11, 51, 11',
51, 11", 51" Chisel edge
11a, 51a, 11a',
51a', 11a", 51a" Residual chisel edge
11b, 51b, 11b',
51b', 11b", 51b" Chisel edge inner region
11c, 51c, 11c',
51c', 11c", 51c" Chisel edge outer region
12, 52, 12',
52', 12", 52" Outer region of curvature
13, 53, 13',
53', 13", 53" Inner region of curvature
15, 55 Chip groove
16, 56 Coolant bore
17, 57 Cutting edge corners
18, 58 Bevel
19, 59 Chip surface
19b, 59b Groove land surface
19c, 59c Chip surface edges
20, 60 Land
21, 61 Point thinning region
22, 62 Inwardly bevelled portion
23a,b,63a,b End surfaces
24, 25,64,65 End surface edges
25a, 65a End surface edge inner region
25b, 65b Region of curvature
25a, 65a Bend
26, 66 Load-bearing region
A Tool axis
B Drill diameter
D', D" Triangle
E', E" End point
F', F" Base side
S', S" Tip
h Height
m Line of symmetry
l Length
b Width

We claim:

1. A drilling tool:
a) which is rotatable about a central tool axis,
b) which has at least two main cutting edges which are arranged on a face side and which merge in the inward direction toward the tool axis into at least one chisel edge,
c) with the chisel edge running on the face side in or over a central region surrounding the tool axis,
d) with the chisel edge, in at least one point thinning region, forming an inner region of curvature and an outer region of curvature as viewed relative to the central axis,
e) with the inner region of curvature being curved oppositely to the outer region of curvature,
f) with the chisel edge having, in the at least one point thinning region, an at least approximately straight chisel edge outer region, and adjoining the chisel edge outer region in the inward direction, an at least approximately straight chisel edge inner region, with the inner region of curvature being situated between the chisel edge inner region and chisel edge outer region,
g) with the chisel edge forming a residual chisel edge, the residual chisel edge extending from the chisel edge inner region toward the central axis,
h) with the outer region of curvature having a left-hand curvature in the direction to the tool axis, and with the inner region of curvature having a right-hand curvature in the direction to the tool axis.

2. The drilling tool as claimed in claim 1:
a) with cutting edge corners being formed at the outer ends of the main cutting edges,
b) with a straight connecting line being defined which runs through the two cutting edge corners of the main cutting edges situated opposite one another in relation to the tool axis,
c) with a chisel edge inner region running from the outer end of the residual chisel edge within a triangular region with an angle of between −15° and +15° in relation to a parallel to the connecting line, the chisel edge inner region having a length of $\frac{1}{100}$ to $\frac{1}{10}$ of the drill diameter,
d) with the chisel edge entering the triangular region at its tip and departing from the triangular region at a side opposing the tip,
e) with the side opposite the tip running one of straight, or at an angle of 90° to the connecting line,
f) with the chisel edge departing from the triangular region at an angle of at least 25° with respect to the connecting line, and at an angle of a maximum of 65° with respect to the side opposite the tip.

3. The drilling tool as claimed in claim 2:
a) with the triangular region having a height parallel to the tool axis corresponding to half the height of the triangle, and the start of the chisel edge inner region being arranged in the center of the height of the triangular region having the height parallel to the tool axis, and
b) with the triangular region being in the form of a pyramid with the start of the chisel edge inner region as a tip.

4. The drilling tool as claimed in claim 2:
a) with the residual chisel edge running straight,
b) with at least the chisel edge forming a centering tip, and with the centering tip running straight,
c) with a clearance angle of 8° to 15° being present between the centering tip of the drilling tool and a planar surface to be machined.

5. The drilling tool as claimed in claim 1:
with the outer region of curvature having a convex curvature and the inner region of curvature having a concave curvature and with a point of inflection being formed between the outer region of curvature and inner region of curvature.

6. The drilling tool as claimed in claim 1:
with the outer region of curvature being situated directly adjacent to the main cutting edge, and with the transition of the chisel edge into the main cutting edges taking place at the outer edge of the central region.

7. The drilling tool as claimed in claim 1, wherein the outer region of curvature and the inner region of curvature are formed by a rounded portion.

8. The drilling tool as claimed in claim 1, wherein the radius of curvature of the outer region of curvature is selected from a range between 0.08 mm and 3 mm.

9. The drilling tool as claimed in claim 1, wherein the radius of curvature of the inner region of curvature is selected from a range between 0.1 mm and 1 mm.

10. The drilling tool as claimed in claim 9, wherein the chisel edge inner region and chisel edge outer region enclose an angle that lies between 130° and 160.

11. The drilling tool as claimed in claim 1, wherein:
a) cutting edge corners are formed at the outer ends of the main cutting edges, and b) a straight connecting line is defined which: i) in the presence of two cutting edge corners of the main cutting edges situated opposite one another in relation to the tool axis, runs through the two cutting edge corners, and ii) if an opposite main cutting edge is not present, runs through a cutting edge corner and the tool axis.

12. The drilling tool as claimed in claim 11, wherein the chisel edge inner region runs at an angle with respect to the connecting line, which angle is selected to be in a range from −20° to 30° relative to the connecting line.

13. The drilling tool as claimed in claim 11, wherein the chisel edge outer region runs at an angle with respect to the connecting line, which angle is selected to be in a range from 20° to 50°.

14. The drilling tool as claimed in claim 1, wherein the residual chisel edge is formed in the innermost region running at the inside adjoining the point thinning region.

15. The drilling tool as claimed in claim 11, which on its face side forms end surfaces, with the residual chisel edge being formed in the region dividing the end surfaces.

16. The drilling tool as claimed in claim 15, wherein an angle is formed between the chisel edge inner region and residual chisel edge, which angle is an obtuse angle in a range from 110° to 150°.

17. The drilling tool as claimed in claim 15, wherein an angle is formed between the residual chisel edge and connecting line, which angle is an acute angle in a range from 40° to 60°.

18. The drilling tool as claimed in claim 15, wherein the sum of the angle between the chisel edge inner region and residual chisel edge on the one hand and the angle between the residual chisel edge and connecting line on the other hand is between 170° and 190°.

19. The drilling tool as claimed in claim 15,
a) wherein the chisel edge forms a centering region in the region of the tool axis, and said centering region, in a section plane formed by the residual chisel edge, is delimited by the point thinning region, and merges, in a section plane formed by the connecting line, into end surfaces;
b) with the end surfaces being delimited by at least one end surface edge and a main cutting edge, and is provided with a conical point grinding; and
c) with any of the chisel edge, the residual chisel edge, and the point thinning region being generated by a conical point grinding.

20. The drilling tool as claimed in claim 1, with the length of the chisel edge inner region amounting to between $1/100$ and $1/10$ of the drilling tool diameter.

21. The drilling tool as claimed in claim 1,
a) with the at least one main cutting edge being designed to conform along its profile in the same direction with the same level of curvature;
b) with the main cutting edges being arranged on load-bearing regions which extend radially outward from the central region and run preferably helically in the axial direction and which on their side surfaces form the chip surfaces and on their outer surfaces form a land;
c) with the drilling tool having bevels which determine the maximum diameter of the drilling tool;
d) with the drilling tool having a relatively small diameter between the bevels, and
e) with the drilling tool having at least two chip grooves which open out on the face side, with the main cutting edges being arranged at a face-side end of the chip grooves, with coolant ducts being arranged between the chip grooves.

22. The drilling tool as claimed in claim 21,
a) with the point thinning region extending over the chip surface over a depth of a maximum of 50% of the diameter of the drill; and
b) with the point thinning region forming an inwardly bevelled portion, such that the chisel edge has the appearance of an S-shape as viewed from the face side.

\* \* \* \* \*

UNITED STATES PATENT AND TRADEMARK OFFICE
CERTIFICATE OF CORRECTION

Page 1 of 2

PATENT NO. : 8,858,134 B2
APPLICATION NO. : 12/812864
DATED : October 14, 2014
INVENTOR(S) : Glimpel et al.

It is certified that error appears in the above-identified patent and that said Letters Patent is hereby corrected as shown below:

Drawings
Sheet 2, replace FIG. 2 with the figure depicted herein below, wherein the reference number "59b" is added to the drawing Specification
Column 6
Line 55, change "cool" to --tool--

Signed and Sealed this
Twenty-seventh Day of October, 2015

Michelle K. Lee
*Director of the United States Patent and Trademark Office*

Column 7
Line 61, change "25" to --15--

Column 8
Line 8, change "51" to --61--
Line 9, change "59*a*" to --59--
Line 9, change "groove correspondingly" to --groove 55 correspondingly--

Column 12
Line 64, change "160" to --160°--